United States Patent [19]

Onda et al.

[11] Patent Number: 5,244,470
[45] Date of Patent: Sep. 14, 1993

[54] METHOD FOR MARKING A WATER-ABSORPTIVE CONTACT LENS: DYEING DRY LENS WITH A MARK USING REDUCED VAT DYE AND THEN MAKING THE DYE INSOLUBLE

[75] Inventors: Koji Onda; Toshihisa Sakai, both of Gifu; Yasuhiro Yokoyama, Nagoya; Takanori Shibata, Nagoya; Yasuyuki Kato, Nagoya, all of Japan

[73] Assignees: Menicon Co., Ltd.; Tomei Sangyo Kabushiki Kaisha, both of Nagoya, Japan

[21] Appl. No.: 826,769

[22] Filed: Jan. 28, 1992

[51] Int. Cl.$^5$ ............................ D06P 5/00; D06P 3/00; G02C 7/04
[52] U.S. Cl. ............................................ 8/507; 8/650; 8/651; 8/653
[58] Field of Search ................................... 8/507, 653

[56] References Cited

U.S. PATENT DOCUMENTS

| | | | |
|---|---|---|---|
| 4,238,524 | 12/1980 | La Liberte et al. | 8/507 |
| 4,494,954 | 1/1985 | Suminoe et al. | 8/507 |
| 4,518,390 | 5/1985 | Rabenau et al. | 8/507 |
| 4,777,684 | 10/1988 | Johnson | 8/507 |
| 4,898,695 | 2/1990 | Doshi | 264/2.6 |
| 4,981,487 | 1/1991 | da Costa | 8/507 |

FOREIGN PATENT DOCUMENTS

| | | |
|---|---|---|
| 63-264719 | 11/1988 | Japan . |
| 3-107121 | 5/1991 | Japan . |
| 1583492 | 1/1981 | United Kingdom . |

*Primary Examiner*—A. Lionel Clingman
*Attorney, Agent, or Firm*—Oblon, Spivak, McClelland, Maier & Neustadt

[57] ABSTRACT

A method for tinting a water-absorptive contact lens to have a mark tinted thereon, which comprises superimposing on a water-absorptive contact lens in the dry state a screen provided with a tinting pattern corresponding to the mark to be tinted on the contact lens, applying to the contact lens through the tinting pattern of the screen a dye solution containing a vat dye and an alkaline reducing agent, followed by insolubilizing the vat dye.

7 Claims, No Drawings

METHOD FOR MARKING A WATER-ABSORPTIVE CONTACT LENS: DYEING DRY LENS WITH A MARK USING REDUCED VAT DYE AND THEN MAKING THE DYE INSOLUBLE

BACKGROUND OF THE INVENTION

1. Field of the Invention

The present invention relates to a method for tinting a water-absorptive contact lens. More particularly, it relates to a method whereby it is possible to certainly apply tinting to the predetermined surface of the lens.

2. Discussion of Background

The tinting of contact lenses brings about some merits such that it is effective for protecting the users from bright light, it makes it easy to find contact lenses when lost, and it serves to improve the image of the commercial products. Thus, it has been in practice to slightly tint entire lenses or to tint only desired portions of the lenses. Further, marks such as letters, designs or symbols may be tinted at desired portions of contact lenses to identify them, whereby classification or grouping of lenses may be facilitated by the identification of contact lens standards, or contact lenses for right and left eyes can be distinguished, so that the users may be prevented from erroneously applying the contact lenses to opposite eyes.

The tinting of marks such as letters or designs is effective especially for water-absorptive contact lenses, since it is thereby possible to readily distinguish the front and rear sides. Namely, such water-absorptive contact lenses become soft upon absorption of water, whereby the convex and concave sides of such lenses are likely to be readily inverted in such a swelled state (in a water-containing state or a hydrated state) and it is very difficult to distinguish the front and rear sides since the convex side can not necessarily be regarded as the front side of the lens, although such soft contact lenses have excellent characteristics such that they provide a comfortable wearing feeling to the users and they are highly safe to the eyes. By tinting a mark such as letters, it is possible to distinguish the front and rear sides of a contact lens quite easily, since the side on which the mark is tinted can be identified as the front side of the lens.

As a tinting or marking method for such a water-absorptive contact lens, there have been proposed a method wherein marking is conducted by irradiating a laser beam to a contact lens in a swelled state (Japanese Examined Patent Publication No. 37368/1987, a method wherein a dye solution is applied to a contact lens in a swelled state, followed by irradiating ultraviolet rays thereto to fix the dye solution (Japanese Examined Patent Publication No. 10045/1989) and a method wherein a contact lens in a swelled state is tinted by means of a tinting agent containing a vat dye and a reducing agent (Japanese Unexamined Patent Publication No. 26471/88. In each case, the marking is applied to a contact lens in a swelled state (in a water-containing state). As described above, with a water-absorptive contact lens, the convex and concave sides are likely to be readily inverted in the swelled state, and if the tinting operation is conducted in the inverted state, the dye solution which should be applied to the front side of the lens may erroneously be applied to the rear side of the lens.

Once a mark is applied to a lens, the lens will be handled as indicated by the mark. Therefore, with a mis-marked contact lens, the user is likely to use the contact lens erroneously with the front and rear sides inverted in accordance with the mis-marking, whereby there will be a problem that the user feels a pain or an uncomfortable wearing feeling, not to mention that a proper lens function can not be thereby obtained.

OBJECTS OF THE INVENTION

Under these circumstances, it is an object of the present invention to avoid mis marking on a water-absorptive contact lens by ensuring that the convex side of the lens constitutes the front side during the tinting operation.

SUMMARY OF THE INVENTION

According to the present invention, this object can be accomplished by a method for tinting a water-absorptive contact lens to have a mark tinted thereon, which comprises superimposing on a water-absorptive contact lens in the dry state a screen provided with a tinting pattern corresponding to the mark to be tinted on the contact lens, applying to the contact lens through the tinting pattern of the screen a dye solution containing a vat dye and an alkaline reducing agent, followed by insolubilizing the vat dye.

DETAILED DESCRIPTION OF THE INVENTION

Now, the present invention will be described in detail with reference to the preferred embodiments.

In the present invention, firstly, a water-absorptive contact lens to which the tinting is to be applied, is prepared to be in a dry state. The water-absorptive contact lens in this dry state may be the one obtained by processing a polymer (block) containing no water. In the case of a contact lens obtained by processing such a polymer in a swelled state, such a contact lens is brought to a dry state prior to the tinting operation. Such a dry state is usually a state such that the water content of the water absorptive contact lens is lowered, whereby the flexibility is lowered to such an extent that the convex and concave sides of the lens would not be inverted. Accordingly, in the present invention, the water content is adjusted usually to a level of not higher than about 5% in order to reduce the flexibility to such an extent that at least the convex and concave sides of the lens would not be inverted.

The dye solution to be applied to such a water-absorptive contact lens in the dry state, contains a vat dye as a color developing component and further contains an alkaline reducing agent.

Specifically, this vat dye is suitably selected from various conventional vat dyes. For example, C.I. Vat Blue 6 or C.I. Vat Green 1 of anthraquinone type, or C.I. Vat Blue 1 or C.I. Vat Black 1 of indigo type, may be employed. The concentration of the vat dye is suitably determined depending upon the type of the dye, the concentration of other additives, etc. so that the dye is uniformly reduced and dissolved. Usually, a concentration of from 0.05 to 2.0% by weight is preferred, and more preferred is from 0.1 to 1.0% by weight. It is preferred to use a vat dye containing a surfactant, so that the dispersibility of the dye in water can be increased.

The alkaline reducing agent is incorporated to reduce the vat dye and convert it to a water-soluble leuco compound, and it is composed of an alkali base material and a reducing agent, which are suitably selected among known products respectively depending upon the above vat dye and incorporated. As a commonly employed alkali base material, an inorganic base such as sodium hydroxide, potassium hydroxide, sodium carbonate or potassium carbonate, may be mentioned. As the reducing agent, sodium hydrosulfite (sodium dithionite) or rongalit obtained by formal-modification thereof, may be employed.

Such an alkali base material and a reducing agent are preferably used in equal amounts. If their amounts are too large or too small, the tinting property tends to be poor. Therefore, they are incorporated in an amount of from 0.05 to 10.0% by weight, respectively. More preferably, they are incorporated in an amount of from 0.1 to 5.0% by weight from the viewpoint of the solubility of the reducing agent and the alkali base material and the degree of reduction of the dye.

The above vat dye is reduced by such an alkaline reducing agent to a water-soluble leuco compound, which is then dissolved in a solvent composed mainly of water to obtain a dye solution. To such a solvent, it is common to incorporate an organic solvent to facilitate the tinting to the lens surface. As such an organic solvent, a lower alcohol such as methanol or ethanol, acetone or acetonitrile may be employed. If its amount is too much, the dye will not be dissolved completely. Therefore, the organic solvent is used usually at a concentration of from about 1 to 90% by weight.

To such a dye solution, a thickener may be incorporated, as the case requires, to control the viscosity. Such a thickener may be any conventional thickener which is commonly employed. For example, sodium arginate, tragacanth rubber, guar rubber, starch, carboxy methylcellulose or polyethylene glycol may be employed. If the amount of the thickener is too much, the viscosity of the dye solution will be high, whereby penetration of the dye into the lens surface will be poor, and the transferring property will be low. Therefore, the amount is preferably not more than 10% by weight.

As the present applicants have mentioned in Japanese Unexamined Patent Publication No. 188824/1989, when polyethylene glycol is used as such a thickener, uniform tinting can be formed, whereby there will be an advantage such that it is possible to prevent tinting irregularities.

The dye solution prepared as described above employs a vat dye, and water used as the solvent excellently penetrates into the lens in the dried state, whereby penetration of the vat dye (a leuco compound) as the color-developing component into the lens is effectively secured, so that strong tinting will be obtained, and an excellent tinted mark will be formed.

A prescribed tinting operation will be carried out to apply such a dye solution to a desired portion of a water-absorptive contact lens prepared in the above-mentioned dry state. In the present invention, a screen-printing method is employed in view of the efficiency and simplicity of tinting.

As is well known, in the screen-printing method, a screen provided with a tinting pattern (a network portion) corresponding to a desired mark such as letters, designs or symbols, is superimposed on the lens, and the above-mentioned dye solution is applied to the lens surface through the tinting pattern of the screen, to conduct tinting. This screen-printing method has a merit such that it is thereby possible to treat a large amount of contact lenses at the same time.

As described above, the water-absorptive contact lens to which tinting is to be applied, is prepared to be in the dry state and has low flexibility, and therefore it is effectively prevented from the inversion of the convex and concave sides, so that during the tinting operation, the front side of the lens always constitutes a convex side. Accordingly, by applying the dye solution in accordance with the convex and concave sides of the lens, it is effectively prevented to erroneously apply the tinting on the opposite sides.

When the dye solution is applied to a lens surface, the water-solubilized vat dye penetrates excellently into the interior of the lens by virtue of the excellent penetrating property of the water in the dye solution. Then, prescribed oxidation treatment is applied to insolubilize the vat dye to complete the tinting of a desired mark such as letters, designs or symbols.

Such oxidation treatment can readily be conducted by oxygen in air or by dissolved oxygen in water. For example, the oxidation treatment can be accomplished by air oxidation by leaving the lens in air, or by boiling treatment in hot water. The oxidation can be facilitated under heating. Therefore, in the present invention, such a heating operation may advantageously be employed. To facilitate the penetration of the dye and to obtain firm tinting, the oxidation treatment is preferably conducted for from a few seconds to a few minutes.

After such oxidation treatment, the contact lens is immersed in water after removal or without removal from the lens securing jig, whereby a swelled water-containing contact lens will be obtained. At that time, it is preferred to thoroughly rinse and clean the lens with water to remove any excess dye not fixed on the lens surface and the alkali contained in the dye solution.

Now, the present invention will be described in further detail with reference to some Examples. However, it should be understood that the present invention is by no means restricted by such specific Examples.

Further, it should be understood that various modifications, changes and improvements may be made to the present invention on the basis of the knowledge of those skilled in the art without departing from the spirit of the present invention.

Firstly, ten dye solutions (A to J) were prepared in accordance with the compositions as identified in Table 1, and then using these dye solutions, tinting was applied to three different types of water-absorptive contact lenses.

TABLE 1

| Dye solution | | A | B | C | D | E | F | G | H | I | J |
|---|---|---|---|---|---|---|---|---|---|---|---|
| Dye | C.I. Vat Blue 6 (g) | 0.25 | 0.25 | 0.25 | — | 0.70 | 0.30 | 0.25 | 0.25 | 0.50 | 0.50 |
| | C.I. Vat Black 1 (g) | — | — | — | 0.88 | — | — | — | — | — | — |
| Alkali base material (NaOH) (g) | | 1.87 | 1.87 | 1.87 | 1.65 | 2.00 | 2.00 | 1.00 | 1.00 | 1.00 | 1.00 |
| Reducing Agent (sodium hydrosulfite) (g) | | 1.87 | 1.87 | 1.87 | 1.65 | 2.00 | 2.00 | 1.00 | 1.00 | 1.00 | 1.00 |
| Organic solvent | Acetonitrile (g) | 1.87 | — | — | — | — | — | — | — | — | — |
| | Ethanol (g) | — | 0.87 | — | 40.00 | — | — | 50.00 | 50.00 | 50.00 | 50.00 |

TABLE 1-continued

| Dye solution | A | B | C | D | E | F | G | H | I | J |
|---|---|---|---|---|---|---|---|---|---|---|
| Methanol (g) | — | — | — | — | 50.00 | 44.00 | — | — | — | — |
| Water (g) | 94.14 | 94.14 | 96.01 | 60.00 | 50.00 | 44.00 | 50.00 | 50.00 | 50.00 | 50.00 |
| Thickener (Polyethylene glycol) (g) (Mn = 2000) | — | — | — | — | — | 9.00 | 2.00 | 4.00 | 2.00 | 4.00 |

EXAMPLES 1 TO 5

A water-absorptive contact lens obtained by processing from a water-absorptive contact lens material made of a polymer containing dimethyl acrylamide as the main component and having a water content of 80%, was secured to a lens-securing jig in its dry state, and a marking screen was brought in contact thereon under pressure, and one drop of the above identified dye solution A, B, C, G or H was applied by means of a dropping pipette.

Then, after being left to stand at room temperature for 20 seconds, the contact lens was, together with the lens-securing jig, immersed in a physiological sodium chloride aqueous solution. In each case, water-absorptive contact lens having a desired symbol tinted excellently was obtained.

EXAMPLE 6

A water-absorptive contact lens obtained by processing from a water-absorptive contact lens material made of a polymer containing 2-hydroxyethyl methacrylate as the main component and having a water content of 38%, was secured to a lens-securing jig, and a marking screen was brought in contact thereon under pressure, and one drop of the above identified dye solution D was applied by means of a dropping pipette.

Then, after being left to stand at room temperature for 20 seconds, such a contact lens was removed from the lens-securing jig and immersed in a 0.9% sodium chloride aqueous solution containing 0.3% of a surfactant "Pronone 204" (tradename) and then rinsed to obtain a lens in a swelled state having a desired symbol tinted excellently.

EXAMPLES 7 TO 10

A water-absorptive contact lens obtained by processing from a water absorptive contact lens material made of a polymer containing vinyl acetate as the main component and having a water content of 80%, was secured to a lens-securing jig, and a marking screen was brought in contact thereon under pressure, and one drop of the above identified dye solution E, F, I or J was applied by means of a dropping pipette.

Then, after being left to stand at room temperature for 90 seconds, such a contact lens was removed from the lens-securing jig and immersed in a 0.25N NaOH-methanol solution for 2 hours for saponification. Then, the contact lens was washed with water and further boiled for 24 hours, whereby a water absorptive contact lens having a desired symbol tinted was obtained.

As is apparent from the foregoing description, according to the present invention, a lens in the dry state having low flexibility is used for the tinting operation of a water-absorptive contact lens, whereby inversion of the convex and concave sides of the lens can be avoided and the front side of the lens is always presented as the convex side of the lens. Accordingly, by applying tinting in accordance with the convex and concave sides of the lens, it is possible to properly tint a desired mark at an intended place on the prescribed side of the lens.

Further, a screen provided with a tinting pattern corresponding to a desired mark such as letters, designs or symbols, is used for applying a dye solution to the lens, whereby tinting can be conducted efficiency and easily, and a large amount of contact lenses can be tinted at the same time.

What is claimed is:

1. A method for marking a water-absorptive contact lens to have a mark tinted thereon, which comprises superimposing on a water-absorptive contact lens in the dry state a screen provided with a tinting pattern corresponding to the mark to be tinted on the contact lens, applying to the contact lens through the tinting pattern of the screen a dye solution containing a vat dye and an alkaline reducing agent, followed by insolubilizing the vat dye.

2. The method according to claim 1, wherein the dye solution contains from 0.05 to 2.0% by weight of the vat dye.

3. The method according to claim 1, wherein the alkaline reducing agent comprises an alkali base material and a reducing agent, each in an amount of from 0.05 to 10.0% by weight in the dye solution.

4. The method according to claim 1, wherein the dye solution is an aqueous solution containing from 1 to 90% by weight of an organic solvent selected from the group consisting of methanol, ethanol, acetone, and acetonitrile.

5. The method according to claim 1, wherein the dye solution contains not more than 10% by weight of a thickener.

6. The method according to claim 1, wherein the insolubilization of the vat dye is conducted by oxidation treatment.

7. The method according to claim 6, wherein the oxidation treatment is conducted in air or in water under heating.

* * * * *